Aug. 17, 1965 D. B. DU BOIS 3,200,529
HACKLE WRAPPING TOOL
Filed Dec. 7, 1961
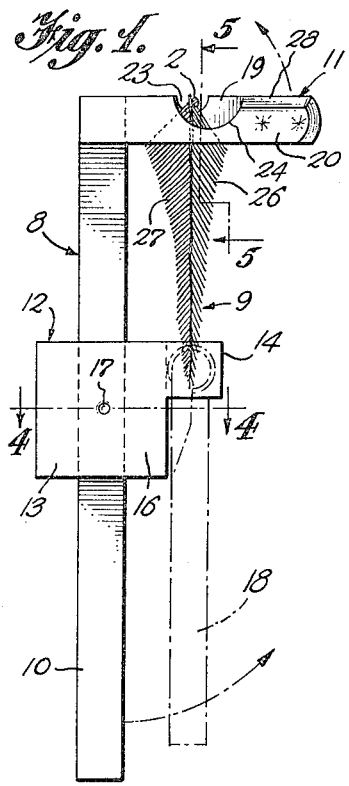
Fig. 1.
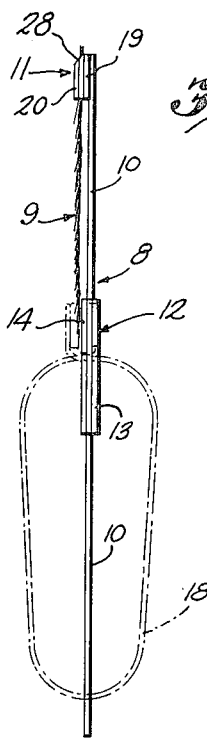
Fig. 2.
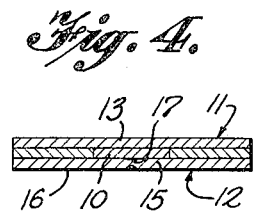
Fig. 4.
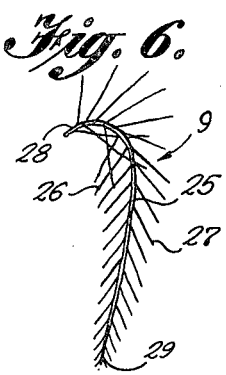
Fig. 6.
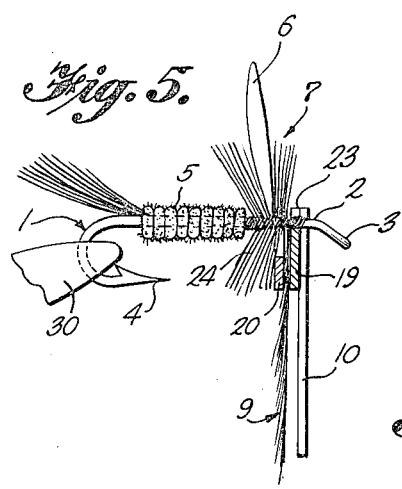
Fig. 5.
Fig. 3.
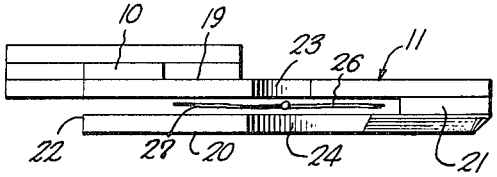
Fig. 7.
INVENTOR
Donald B. DuBois
BY
Mason, Fenwick & Lawrence
ATTORNEYS

United States Patent Office 3,200,529
Patented Aug. 17, 1965

3,200,529
HACKLE WRAPPING TOOL
Donald B. Du Bois, 2332 N. Tuckahoe St., Arlington, Va.
Filed Dec. 7, 1961, Ser. No. 157,713
4 Claims. (Cl. 43—1)

This invention relates to tools for aiding in the making of fishing flies, and more particularly to such tools for handling feathers while wrapping them about the shanks of fish hooks to form hackles.

In the construction, or tying, of fishing flies, the various parts of the fly body, wings, tail, hackle, etc., are formed by winding yarn upon the shank of a selected fish hook (as in making the body) or, in tying bits of feathers to the shank (as in providing wings and tail), or, in winding a feather about the shank (as in forming the hackle). As the hooks and other materials used are quite small, considerable skill is required to make a suitable fly. Some of the operations, such as wrapping a hackle, frequently present even the experts with serious problems.

In forming a hackle, a hackle feather is selected, and its quill end is tied to the hook shank. The distal, or tip, end of the feather is then gripped by a spring clamp, or hackle pliers, and the feather adjusted so that its vane extends crosswise to the hook shank, and the feather wrapped around the hook shank while being held in this position. In other words, the feather must be held so that its edge is always presented to the hook shank at right angles to the axis of the shank, to ensure a circular ruff being formed about the shank, with the feather shaft lying in spiral convolutions about the shank and the barbs extending outwardly from the shank radially to the shank. Hackle feathers are relatively soft, and they are gripped by the hackle pliers some distance from the feather attachment to the hook. Because of this, it frequently is impossible to control the angle of the feather vane adjacent the hook shank, as turning movement of the pliers to correct an offset vane position is absorbed in the feather by a twisting of the shaft. This often results in an improperly positioned hackle, or throwing away a curled, or twisted, feather because it cannot be controlled to hold the vane at right angles to the hook shank.

The general object of the present invention is to provide means for wrapping a hackle, which will overcome the difficulties perviously encountered in properly positioning the hackle on the hook.

A more specific object is the provision of means wherein the feather angular position is controlled closely adjacent the hook shank, so that positive angular control is had at the point where control is needed.

Another object is to provide a tool for holding the feather during wrapping which will slidingly confine the feather across the full width of the feather vane adjacent the point of bending about the hook shank.

A further object of the invention is the provision of a hackle wrapping tool which will gently hold the barbs on both sides of the shaft of the feather in a common plane, adjacent the point of bending, while bending in the plane of the barbs.

Yet another object is the provision of a tool of this type having guide means to engage a hook shank to assist in turning the tool about the hook shank to wrap the feather about the shank.

A still further object of the invention is to provide a hackle wrapping tool which is easily threaded with a feather, so that it may be quickly set up for use.

It is also an object to provide a tool which will hold a pair of feathers in proper angular position and insure proper helical winding of the two feathers on the hook shank, by preventing separation of the two feathers as they are wound upon the shank of the hook.

Other objects of the invention will become apparent from the following description of one practical embodiment thereof, when taken in conjunction with the drawings which accompany, and form part of, this specification.

In the drawings:

FIGURE 1 is a side elevation of a hackle wrapping tool embodying the principles of the present invention, with a feather in place in the tool, and the tool in operative position adjacent a hook shank and ready to begin a wrapping operation;

FIGURE 2 is an edge elevation of the structure shown in FIGURE 1;

FIGURE 3 is a top plan view of the tool;

FIGURE 4 is a horizontal section through the tool, taken on the ilne 4—4 of FIGURE 1;

FIGURE 5 is a vertical section through the upper part of the tool, taken on the line 5—5 of FIGURE 1, with the tool in position to wrap a hackle on a partially constructed fly held in a vise;

FIGURE 6 is a view of a feather with the shaft bent in the plane of the vane of the feather, illustrating the resulting positions of the barbs emanating from both sides of the shaft; and FIGURE 7 is a view on an enlarged scale showing a portion of a hook shank with several convolutions of a feather shaft wound thereon, depicting, somewhat diagrammatically, the final dispositions of the barbs from both sides of the shaft.

In general, the proposed tool permits wrapping hackle by positioning the feather at right angles to the shank of a hook upon which it is to be wound, and winding the feather about the shank while holding the feather in a fixed plane closely adjacent the point of wind. The tool will have means to slidingly confine the feather across the full feather width to hold it in a predetermined plane while the feather slips through the holding means during winding. The tool will have means to position it upon the shank of a hook for rotation about the shank, and means to yieldingly hold the unwound portion of the feather in fully extended condition during the entire winding operation.

Referring to the drawings in detail, and first referring to FIGURE 5, there is shown a fishing fly in the process of construction. The fly is constructed upon a conventional hook, 1, having a shank 2, with a line-attaching eye 3 at one end, and the curved, barbed hook-end 4. A body 5 of wrapped yarn, or other material, is formed on the hook shank, but terminates some distance short of the eye. Wings 6, of small fragments of feathers, are tied on the shank to project upwardly in conventional fashion. The hackle 7 is wrapped about the shank starting back of the wings and extending along the area between the wings and the hook eye.

The tool 8 is designed to hold a hackle feather 9, and control the feather as it is wrapped around the hook shank to form the fly hackle 7.

Tool 8 consists of a handle 10, having a feather-guiding head 11 at one end, and a feather-restraining slide 12 mounted for movement along the handle.

The handle is preferably a flat member, of appropriate length, having parallel sides, so that it will form a rail of uniform cross-section along which slide 12 may ride. The head 11 will be fixed to one end of the handle in any suitable manner.

Slide 12 can be of any desired shape which will provide for a body 13 and a feather-clamping plate 14. The body will have a central opening 15 to slidingly receive the handle 10. The face 16 of the body, overlying the opening, may be indented to proivde an inward projection 17 for frictional engagement with the tool handle to yieldingly hold the slide against movement along the handle. This braking action is very light, so that the slide will move along the handle when a pull is exerted upon a feather clamped upon the clamping plate, without danger of breakng the feather. The feather tip is clamped to plate 14 by conventional spring grip hackle pliers 18.

The tool head includes a pair of feather-confining guide members 19 and 20. Guide member 19 is rigidly connected at one end to the top of the handle 10, and at its other end to the guide member 20. The guide members lie side-by-side, being connected together at one end only. They are made of any suitable material, and are adapted to confine and guide a feather placed between them. As the guide members are held in slightly spaced relation by a spacer 21 between them at their point of connection, a feather can be slipped freely into the mouth 22 between the unconnected ends of the guide members adjacent the handle. The feather will be slipped in edgewise, and the guide members, being closely spaced, and extending across the full width of the feather, will confine the feather and positively hold it against turning in this region.

Guide member 19 has a notch 23 in its upper edge, to provide a guide seat for the shank of the hook. In use, the tool will be placed against the hook shank, with the shank in the notch, so that the tool will be accurately positioned on the hook, and slipping of the tool relative to the hook shank will be prevented. Guide member 20 is also notched, as at 24, to provide free access to the guide seat of notch 23. The notch 24 is considerably wider and deeper than notch 23, with the extra width of the opening being away from the handle of the tool. This is to permit freedom to the barbs on one side of the feather shaft to cross over the shaft during winding, as will be described.

When the tool is to be used, a selected feather, such as the feather 9 in FIGURE 6 having a shaft 25, barbs 26 and 27 on opposite sides of the shaft, a quill end 28 and tip 29, is slipped edgewise into the open mouth 22 and between the guide members of the head of the tool. The feather is placed so that its quill end projects just above the top of the head, and the feather shaft lies adjacent the notch 23 in the guide member 19. The barbs on either side of the shaft will be confined by the guide members so that an appreciable amount of the feather will be held flat and in the plane of the tool head. This will leave a considerable length of the feather below the head, unsupported by the head. In order that the entire feather may be held in position, the tip is placed upon the clamping plate 14 of the slide, and the feather tip and plate are gripped by hackle pliers. With the slide drawn down the tool handle until the feather is at its full length, the entire feather will be under control. The frictional grip of the slide on the handle will hold the parts in this condition until the feather is drawn through the head, whereupon the slide will move along the handle, maintaining the feather in extended position.

When the feather is in position in the tool, the quill is placed against the shank of a hook held in a vise 30, and the quill tied to the shank just in back of the juncture of the wings with the shank.

When wrapping, the tool is placed against the hook, with the hook shank seated in the notch 23 in the head, and the tool positioned so that the head is at right angles to the axis of the shank. This position is shown in FIGURES 1 and 5 of the drawings. Referring particularly to FIGURE 1, the entire tool will be rotated about the hook in a counterclockwise direction, as shown by the arrow, so that the feather shaft will be wound about the hook shank and the barbs will project radially outwardly to form a ruff. During the winding operation, the slide will move up the tool handle as the feather is taken up.

It will be observed that the entire width of the feather adjacent the hook will be between the guide members of the head and, therefore, confined against turning relative to the head, and as long as the tool is held at the proper angle to the hook the plane of the feather adjacent the hook must be correct. With the notch 23 seated on the hook it becomes almost automatic to hold the tool at the proper angle. The confinement and guiding of the feather is progressive and continuing, as the feather slides through the head during winding.

As the feather is wound on the hook, the barbs 27 on the outside of the bend (see FIGURE 6) will project freely from the shaft in an outward direction. It has been noticed, however, that barbs 26 on the inside of the bend first approach the shaft, and then move past it, to project with barbs 27 to the outside, so that when the winding is completed all of the barbs extend outwardly. Although the spacing between the tool guide members is sufficient to permit the barbs on the inside to cross over the shaft, the larger notch 24 in the jaw 20, offset from notch 23 in the direction of wind, provides added freedom in the area of the bending feather shaft for the inside barbs to pass over the shaft.

It will be noted that the upper edge of guide member 20 is bevelled, outboard of the notch 24, as at 28. This provides a tapered head in the direction of winding movement of the tool to facilitate entry of the tool between previously wound feather convolutions, and manipulation about the wings.

With the tool, as described above, the task of wrapping the hackle becomes a relatively simple matter, and the hackle can be put in place with precision. This result is possible even with very soft and twisted feathers, as the feather is completely confined adjacent the bend and held at the proper angle to the hook at the time of winding on the hook shank. This will cause all kinks, or twists, to be removed at the time of winding, and inaccuracy cannot occur. When two feathers are used together, they will be wound in close order and there will be no separation of the shafts of the two feathers.

While in the above one practical embodiment of the invention has been disclosed, it will be understood that the details of construction herein described and shown are merely for purposes of illustration, and the invention may take other forms within the scope of the appended claims.

What is claimed is:

1. A tool for wrapping a hackle feather about the shank of a fishbook in making a fishing fly comprising, a handle and a head carried thereby, the head including an elongated guide member attached at one end to one end of the handle to extend therefrom, a second guide member overlying the first-mentioned guide member and spaced therefrom, the guide members being connected together at their ends remote from the handle and being free from attachment adjacent the handle to provide a feather-inserting mouth, the guide members being long enough to overlie the full width of opposite sides of a feather inserted between them so that the feather may be drawn between the guide members and held against twisting during passage therethrough.

2. A tool for wrapping a hackle feather about the shank of a fishhook in making a fishing fly as claimed in claim 1 wherein, a slide is mounted upon the handle for movement therealong, and means carried by the slide against which a feather tip may be gripped.

3. A tool for wrapping a hackle feather about the shank of a fishhook in making a fishing fly as claimed in claim 2 wherein, the first-mentioned guide member has a notch in one elongated edge to receive the shank of the fishhook at right angles to the plane of the guide member, and the second guide member has a notch wider than the notch in the first-mentioned guide member, overlying the notch in the first-mentioned guide member and extending beyond that notch in a direction away from the tool handle.

4. A tool for wrapping a hackle feather about the shank of a fishhook in making a fishing fly as claimed in claim 3 wherein, the slide has means to frictionally engage the tool handle to restrain movement of the slide along the handle.

References Cited by the Examiner

UNITED STATES PATENTS

| 2,332,655 | 10/43 | Miles | 242—7 |
| 2,489,547 | 11/49 | Temple | 242—7 |
| 2,533,523 | 12/50 | Sivey et al. | 43—42.53 |

FOREIGN PATENTS 1,092,879  11/54  France.

ABRAHAM G. STONE, *Primary Examiner.*

SAMUEL KOREN, *Examiner.*